United States Patent [19]

Ittner et al.

[11] 4,333,598

[45] Jun. 8, 1982

[54] METHOD OF BRAZING HONEYCOMB AND PANEL ASSEMBLIES

[75] Inventors: Nelson C. Ittner, Encino; William I. Rooke, Blue Jay, both of Calif.

[73] Assignee: Alloy Spot Welders, Inc., Los Angeles, Calif.

[21] Appl. No.: 185,305

[22] Filed: Sep. 8, 1980

[51] Int. Cl.³ .............................................. B23K 31/02
[52] U.S. Cl. .................................. 228/181; 219/78.12; 219/85 R
[58] Field of Search ............... 219/78.11, 78.12, 85 R; 228/181

[56] References Cited

U.S. PATENT DOCUMENTS

| | | | |
|---|---|---|---|
| 3,057,057 | 10/1962 | Langhans | 228/181 X |
| 3,071,853 | 1/1963 | Price et al. | 228/181 |
| 3,514,842 | 6/1970 | Beuyukian | 228/181 |

*Primary Examiner*—Elliot A. Goldberg

*Attorney, Agent, or Firm*—Pastoriza & Kelly

[57] ABSTRACT

Rather than spray coat face sheets of honeycomb panels with powder braze alloy or using foil strips of braze alloy between honeycomb core and face sheets, individual ribbon segments of brazing foil are positioned between successive honeycomb cell vertices or nodes. The arrangement is such that several such ribbon segments will lie essentially in parallel planes to each other and normal to the planes of the top and bottom panel sheets when these panel sheets are positioned to sandwich the honeycomb cells therebetween. Heat can then be applied to melt the ribbon segments resulting in a flow of the brazing material into the nodes as well as the contact line joints made between the top and bottom of the cell walls with the top and bottom panel sheets. Excess brazing material on the panel surfaces covering the open cell portions free of joints is thereby virtually eliminated and desirable ductility and elongation characteristics of the resulting structure are retained.

9 Claims, 7 Drawing Figures

METHOD OF BRAZING HONEYCOMB AND PANEL ASSEMBLIES

This invention relates generally to manufacturing methods and more particularly to an improved method of brazing honeycomb and panel assemblies.

BACKGROUND OF THE INVENTION

Brazing of structural elements such as honeycomb and panel assemblies is normally carried out by coating with a brazing powder suspended in a binder or provided in the form of thin sheets or strips of brazing material on the opposed surfaces of the panel members of the honeycomb structure. When the honeycomb structure is sandwiched between the panel members and heat is applied, the brazing material will melt and flow into the joints defined between the honeycomb cells and their contact lines with the opposed panel surfaces.

A desirable characteristic or property of finished honeycomb panel assemblies is referred to as ductility or elongation. Normally certain structure materials can be elongated a certain percentage of their original unit length without harming the structural integrity. However, where the structure material takes the form of a honeycomb cell structure with brazed top and bottom panels, the elongation property is substantially impaired. In other words, only a very small percentage elongation of the material is possible before failure occurs. This characteristic of the honeycomb and brazed panel sheets thereto is believed a direct result of the particular methods and means employed at the present time to braze the various elements together. For example, with the use of large area coverage of brazing material on the surfaces of the opposed panels, there is an excess of brazing material which permanently remains on the opposing surfaces of the panels and thereby impairs the elongation characteristics of the panels themselves.

Further, as a consequence of present day techniques, more brazing material is used than is actually necessary to braze the specific joints involved in a honeycomb-panel configuration. The result is not only a waste but an increased expense and an increase in the overall weight of the panel itself. These disadvantages are cumulative with respect to the aforementioned problems associated with physical elongation.

BRIEF DESCRIPTION OF THE PRESENT INVENTION

With the foregoing considerations in mind, the present invention contemplates an improved method of brazing honeycomb and panel assemblies wherein the aforementioned problems are overcome.

More particularly, in accord with the method of the present invention substantially less brazing material is required and the resulting brazed panel and honeycomb assembly has a vastly improved elongation characteristic as compared to presently available brazed assemblies.

Briefly, the method involves the positioning of ribbon segments of brazing foil between successive honeycomb cell nodes during the assembly or forming of the honeycomb cells. These ribbon segments will thus lie essentially in parallel planes normal to the planes of the top and bottom panels when the panels are positioned to sandwich the honeycombs therebetween.

When heat is applied to the top and bottom panels to melt the segments of brazing foil, the liquid fills the adjacent joints defined between the vertices of the cells with each other and the top and bottom contact lines of the cell walls with the top and bottom panels. Excess brazing material on the panel surfaces covering the open cell portions free of joints is virtually eliminated.

BRIEF DESCRIPTION OF THE DRAWINGS

A better understanding of the method of this invention will be had by referring to the accompanying drawings in which.

DETAILED DESCRIPTION OF THE INVENTION

Figure 1:
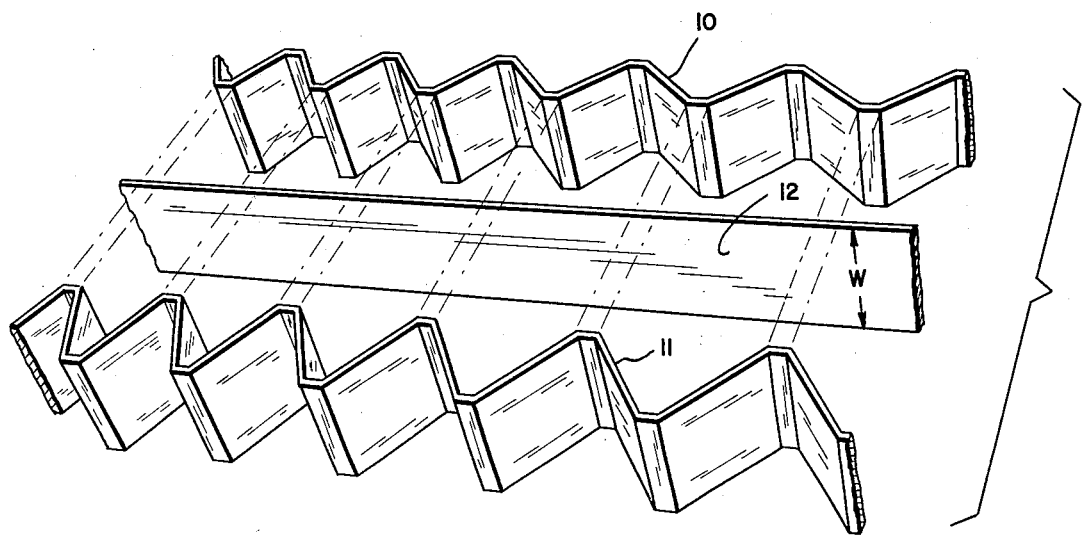
FIG. 1 is an exploded fragmentary perspective view of some of the initial basic elements utilized in accord with the method of the present invention.

Referring first to FIG. 1, there are shown first and second zig-zag formed metal strips 10 and 11 preparatory to being assembled together to define honeycomb cells constituting part of a complete honeycomb structure. In this respect, opposed nodes of the zig-zag shapes strips 10 and 11 are brought together.

In accord with a first step of the method of the present invention, there is provided a brazing foil in the form of a ribbon 12 of given width W. This ribbon is formed into ribbon segments for confinement between the nodes of adjacent zig-zag formed strips such as the strips 10 and 11.

In FIG. 1, each of the strips 10 and 11 have been shown with relatively smooth or flat surfaces following the zig-zag pattern. These surfaces in and of themselves may be provided with much smaller zig-zag configurations or "corrugations" to provide still further strength in a vertical direction and ease of contouring.

The given width W of the brazing ribbon is made substantially equal to the width or height of the metal strips 10 and 11 shown in FIG. 1.

Figure 2:
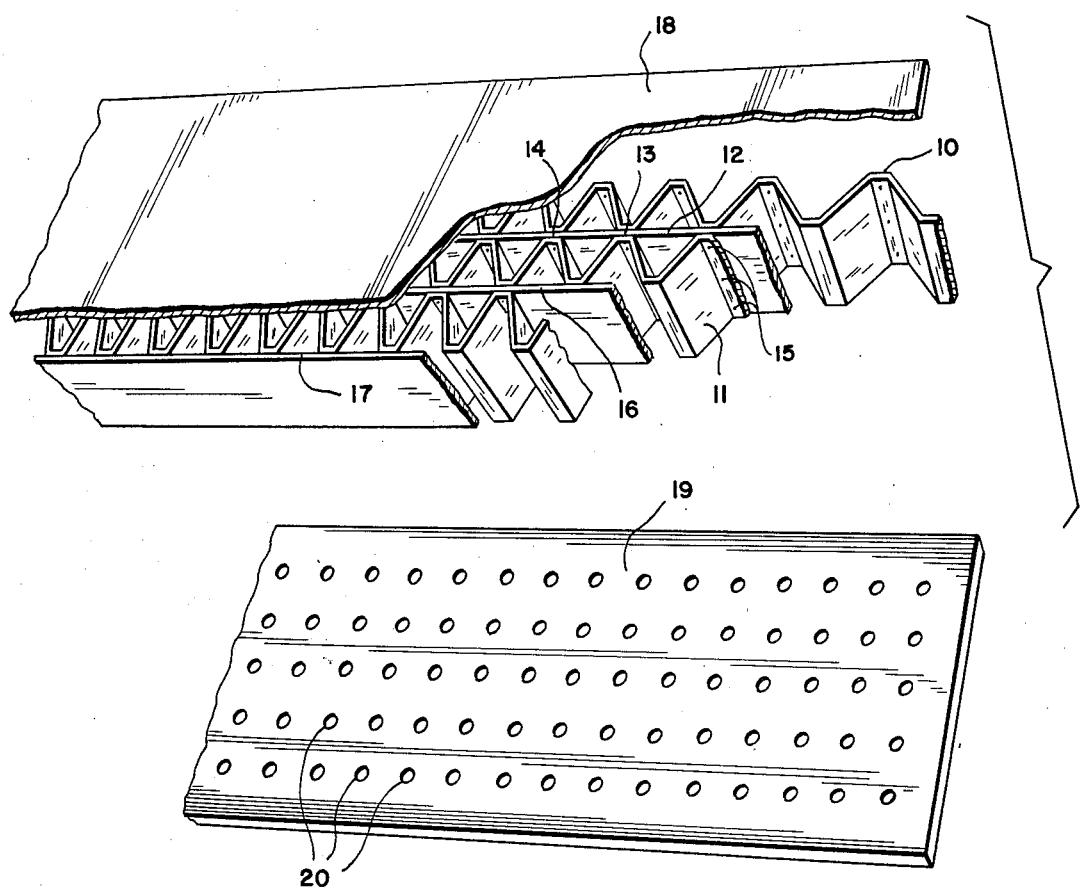
FIG. 2 is another perspective exploded view showing additional elements utilized in manufacturing a honeycomb and panel assembly in accord with the present invention.

Referring now to FIG. 2, the ribbon 12 in the form of a segment is shown positioned between adjacent nodes of the zig-zag strips 10 and 11, two of the adjacent nodes being indicated at 13 and 14. To hold the ribbon and zig-zag strip assembly together, spot welds are made as indicated at 15 at each of the nodes.

Additional ribbon segments indicated at 16 and 17 are provided for successive build-up of zig-zag strips to form a large honeycomb surface area, all in the same manner as described for the ribbon segment 12 and zig-zag strips 10 and 11.

Also shown in FIG. 2 are top and bottom panel sheets 18 and 19 and it will be evident that the ribbon segments of brazing material lie in parallel planes bisecting the cells and lying normal to the top and bottom panel sheets 18 and 19 when the same are positioned to sandwich the honeycomb structure therebetween. It will also be evident that the width W is substantially equal to the height of the cells between the panels.

In the particular embodiment illustrated in FIG. 2, the bottom panel sheet 19 is provided with a plurality of small openings 20 to provide an acoustically absorbing panel.

Figure 3:
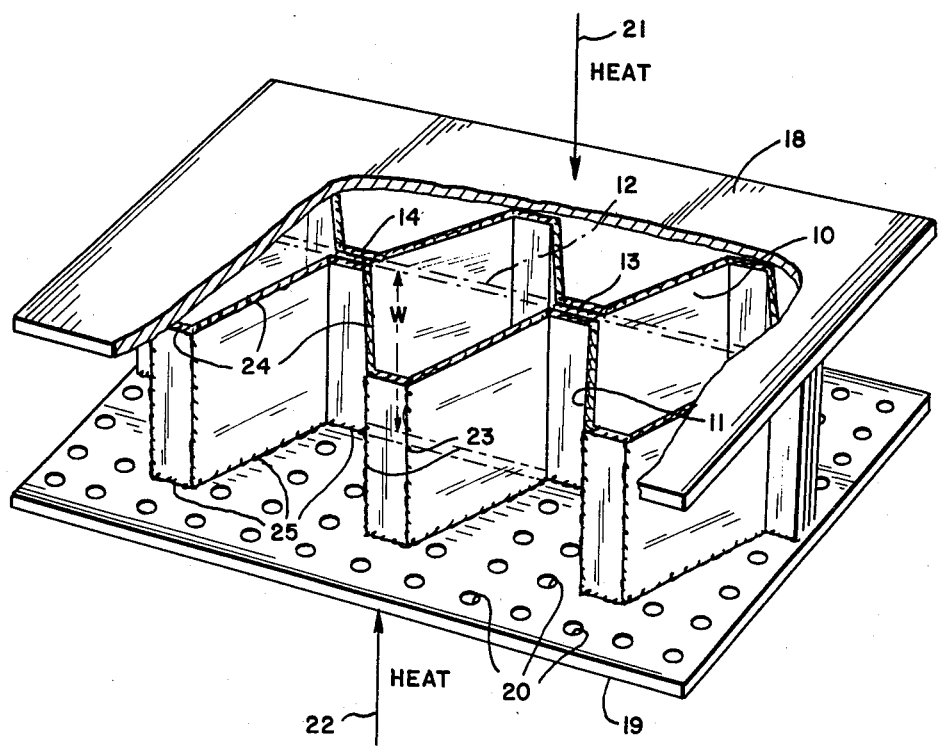
FIG. 3 is yet another perspective view of the components of FIG. 2 in assembled relationship, but broken away to expose certain portions as they would appear after the brazing operation has been completed.

Referring to FIG. 3, there is indicated by the arrows 21 and 22 the application of heat to the panels to effect a melting of the various ribbon segments. This melting results in liquid brazing material seeking and filling all joints defined between the zig-zag strips themselves such as indicated by the joints 23 and the contact lines with the opposing surfaces of the top and bottom sheets 18 and 19, such as indicated at 24 and 25 respectively. The formerly existing ribbon segment is indicated by the phantom lines 12 in FIG. 3, it being understood that under the application of the heat, the same has melted to form the brazing fillets at the joints as described and as indicated in FIG. 3.

It can be appreciated from the foregoing, that because of the orientation of the brazing material in the form of the ribbon segments disposed in planes normal to the plane of the sheets between the nodes as opposed to the provision of large area flat sheets of brazing material on the faces of the opposed panels, there is virtually eliminated the existence of any of the brazing material on the opposed surface portions of the panels 18 and 19 covering the open cells free of the joints.

Because of the absence of brazing material on the opposed panel sheet surfaces in the finalized structure, the elongation characteristics are not seriously impaired and the resulting panel assembly can be subject to various strains and stresses without failure. Further, the risk of plugging the small holes when they are provided for acoustic purposes, is minimized.

While the method described thus far results in a greatly improved honeycomb and panel assembly, and while there is virtually no residue of the brazing material on the opposed panel surfaces free of joints, there still can result inadvertent deposits of beads of the melted brazing material on the wall surfaces of the honeycomb cells themselves. It is believed that such extraneous beads of material on the wall surfaces results from the excess of brazing material provided on portions of the ribbon segments between the nodes. Thus, with reference to FIG. 3 it can be seen that the phantom line ribbon segment 12 essentially bisects the various closed cells defined by the zig-zag strips 10 and 11. It can be appreciated that when this ribbon melts, the portion of the ribbon closest to the nodes will flow neatly into the joint areas while the portion of the ribbon halfway between the nodes in the open portions of the cells will hve no ready place into which to flow and can form a simple bead or chain across the face or faces of the cell itself.

Figure 4:
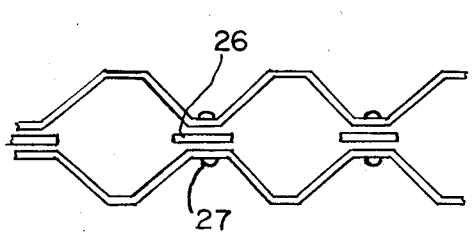
FIG. 4 is a broken away plan view of short ribbon inserts positioned in the cell nodes in accord with an alternative method step.

To help minimize the foregoing action, the ribbon segments may be further cut or segmented to provide small inserts which may be positioned between the nodes as illustrated in FIG. 4. Thus, separate short ribbon segments 26 in the form of inserts are shown positioned between the nodes of the cells and spot welded thereto as at 27. While the insertion of the individual inserts involves different steps than the simple positioning of an elongated ribbon, there is avoided the waste of material that would extend between the nodes.

Figure 5:
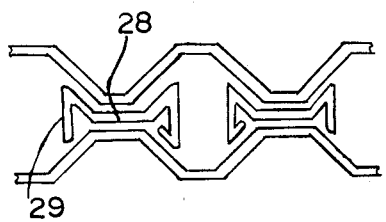
FIG. 5 is a view similar to FIG. 4 showing preformed inserts in the nodes.

To assure that there is sufficient brazing material, the ends of the inserts may be pre-formed such as illustrated in FIG. 5 for inserts 28. Thus, each end is folded over as indicated at 29 so that further brazing material is available as required to fill in the contact joints. The folding over of the ends of the inserts as illustrated in FIG. 5 further facilitates positioning of the same in the nodes.

Figure 6:
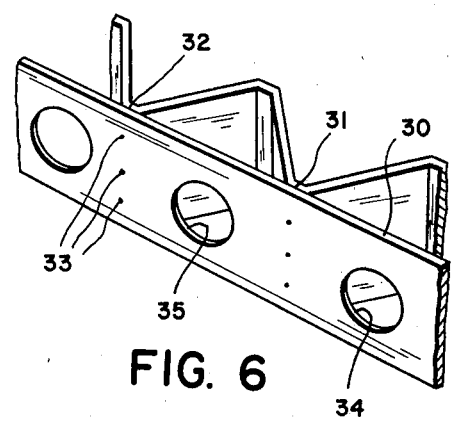
FIG. 6 is a fragmentary perspective view of a modification of one of the steps in the method of the present invention; and, FIG. 7 is a perspective view of an element incorporating an alternative modification to that shown in FIG. 6.
Figure 7:
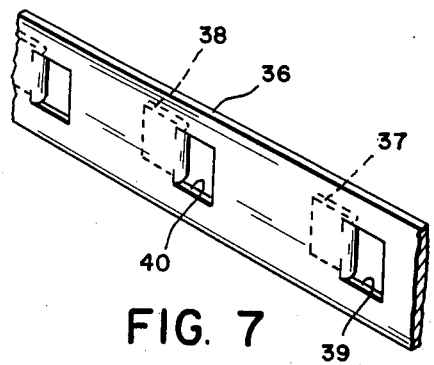

Further alternative arrangements are illustrated in FIGS. 6 and 7.

In FIG. 6, there is shown a brazing ribbon segment 30 again passing along nodes such as indicated at 31 and 32 and being spot-welded thereto such as indicated at 33. In FIG. 6, the zig-zag metal strip on the side opposite the ribbon 30 from the one shown is omitted to avoid obscuring the drawing.

Between the vertices 31 and 32 and the remaining vertices, the portion of the ribbon segment 30 is provided with openings such as indicated at 34 and 35. These openings represent an absence of brazing material in these particular areas and it can be appreciated that there is not removed brazing material adjacent to joint areas but rather only in the free open cell area.

Simply punching out the material to provide the openings 34 and 35 in FIG. 6 can result in a waste of brazing material itself.

One means of overcoming such a waste is to make the overall brazing ribbon slightly thinner and then form the openings by cutting out tabs and folding the tabs back so as to provide a thicker portion of the brazing material closer to the nodes wherein joints are to be brazed. Such a modified configuration is illustrated in FIG. 7 for a brazing ribbon segment 36 wherein tab shapes 37 and 38 are formed and bent backwardly against the material to leave openings 39 and 40 respectively.

With the arrangement of FIG. 7, there is no waste of any of the brazing material since the tab portions are bent back closer to where joints are located and thus will flow into these joints rather than form beads on the surfaces of the cell walls.

From all of the foregoing, it will now be evident that the present invention has provided a greatly improved method of brazing honeycomb cell and panel assemblies together wherein improved elongation properties are realized, less brazing material need be used, and the overall assembly is lighter.

We claim:

1. A method of brazing honeycomb cells to top and bottom panels including the steps of:
    (a) providing ribbon segments of brazing foil having widths substantially equal to the cell heights between the panels;
    (b) positioning said ribbon segments between successive honeycomb cell nodes so as to lie essentially in parallel planes bisecting the cells and extending normal to the planes of the top and bottom panels when positioned to sandwich the honeycomb cells therebetween; and,
    (c) applying heat to the top and bottom panels to melt the ribbon segments of brazing foil to a liquid resulting in the liquid filling the joints defined between the nodes of the cells with each other and the top and bottom contact joint lines of the cell walls with the top and bottom panels whereby excess brazing material on the panel surfaces covering the open cell portions free of joints is virtually eliminated.

2. The method of claim 1, in which said ribbon segments are in the form of inserts received in the cell nodes.

3. The method of claim 1, including the step of providing openings in portions of the ribbon segments between nodes of the honeycomb cells to avoid the presence of excess brazing material.

4. A method of brazing honeycomb and panel assemblies wherein a plurality of zig-zag formed strips are assembled to define honeycomb cells, and top and bottom panel sheets added preparatory to being brazed to the honeycomb cells, including the steps of:

(a) providing a brazing foil in the form of a ribbon of given width substantially equal to the width of said zig-zag formed strips;

(b) confining ribbon segments of said foil between adjacent cell nodes defined by the zig-zag formed strips, the ribbon segments lying in planes bisecting the honeycomb cells and running essentially parallel to each other and also normal to the top and bottom panel sheets to be added;

(c) spot welding the zig-zag strips to the ribbon segments and to each other at said nodes of the honeycomb cells to hold the zig-zag strips and ribbon segments together in assembled relationship;

(d) adding the top and bottom panel sheets to sandwich the honeycomb assembly therebetween;

(e) applying heat to the panels to melt the ribbon segments of the brazing foil to result in liquid brazing material seeking and filling all joints defined between the zig-zag strips themselves and their contact lines with the opposing surfaces of the top and bottom panel sheets; and (f) cooling the honeycomb and panel sheets to harden the fill joints and thereby complete the brazing operation.

5. The method of claim 4, including the step of forming said ribbon segments into inserts individually receivable in the cell nodes.

6. The method of claim 4, including the step of providing a pluarlity of small openings in said bottom panel to provide an acoustically absorbing panel.

7. The method of claim 4, including the step of providing openings in portions of said ribbon segments between said nodes to avoid possible forming of beads by brazing material on wall surface portions of the honeycomb cells.

8. The method of claim 7, in which said openings are provided by punching out tab shapes and bending them back against the ribbon to leave spaces defining said openings.

9. The method of claim 4, including the step of forming said ribbon segments into inserts with folded ends individually receivable in the cell nodes.

* * * * *